Patented July 24, 1934

UNITED STATES PATENT OFFICE 1,967,491

WELDING ELECTRODE

John B. Austin, Cleveland Heights, Ohio, assignor to Una Welding, Incorporated, Cleveland, Ohio, a corporation of Delaware No Drawing. Application November 13, 1931, Serial No. 574,921

8 Claims. (Cl. 219—8)

My invention relates to the art of welding, and more particularly to welding electrodes having a coating containing a high percentage of manganese.

One of the principal objects of my invention is to provide a welding electrode for welding high manganese steel, or for building up worn surfaces composed of such a steel, that will produce a non-magnetic weld which is ductile and of relatively high tensile strength, and which has mechanical properties closely approximating the base metal to which the weld is integrally united.

Another object of my invention is to provide a welding electrode having a base rod composed of low carbon steel containing a substantial quantity of nickel, and a coating containing manganese and carbon in such proportions that a weld metal having a non-magnetic, austenitic structure shall be deposited.

A further object of my invention is to provide a welding electrode having a base rod composed of low carbon steel and a coating containing carbon and manganese in such proportions that a definite predetermined amount of manganese and carbon may be deposited in the weld.

An additional object of my invention is to provide a welding electrode for welding austenitic steel by means of which steel pieces may be joined to produce an article having practically the same strength characteristic as corresponding articles of unitary or one-piece construction.

A still further object of my invention is to provide a method of producing a non-magnetic weld which comprises providing an electrode having a base rod containing a low carbon steel and a substantial quantity of nickel, and a coating containing manganese and carbon in predetermined proportions, so that during deposition of the metal sufficient carbon and manganese shall be introduced into the molten metal of the base rod to produce a non-magnetic weld.

In welding high manganese steel, it has heretofore been the practice to employ a bare or lightly coated welding electrode containing a relatively high percentage of carbon and manganese. In preparing such rods steel manufacturers have, in general, attempted to provide a rod having substantially the same constituents as the metal to be welded. One of the chief disadvantages that has heretofore been encountered in welding manganese steels is the tendency for the weld to either pull away from the base metal, or for cracks to form in the weld itself, because of high contraction stresses, which are considerably greater in manganese steel than in ordinary carbon steel. For example, when manganese steel rods, containing approximately 11% to 15% manganese and 1.00% to 1.50% carbon are utilized in making scarfed or V-shaped welds, or between two or more surfaces so positioned that relatively great tensile stresses are introduced, contraction or shrinkage cracks are almost certain to appear as the metal cools. These cracks generally result at about red heat which is generally exceeded during the welding operation, and it is therefore impossible to prevent this cracking before the welding is interrupted.

Attempts have been made to overcome the foregoing defects by utilizing low currents and by quenching the base metal with water at frequent intervals so as to chill the manganese as it is deposited. Frequent peening of the weld has also been resorted to in order to relieve the shrinkage stresses by working the metal, but even though the utmost precautions have been observed, cracks occur in the welded bead before the arc is interrupted, after which quenching and peening are futile.

By my invention I have provided a welding rod comprising a steel base rod associated with coating material, including arc stabilizing and alloying ingredients, so that the resulting coated electrode shall have a relatively high carbon content, a relatively high manganese content, and a sufficient amount of fluxing ingredients to impart a suitable degree of fluidity to the molten weld metal.

In my improved rod the fluxing ingredient and the major portion of the carbon and manganese content constitute the coating so that the composition of the completed electrode may be readily controlled and the arc characteristic improved.

As a base rod for my electrode I preferably employ a low or medium carbon steel of good quality. For example, a very satisfactory rod is one having an analysis of 0.13% to 0.25% carbon, 0.4% to 0.8% manganese, and 0.06% maximum silicon, the impurities such as sulphur and phosphorus being of the usual low content. My improved rod may also contain from .5% to 7% nickel, the nickel preferably being present in amounts ranging from 3.25% to 3.75%. Rods of higher carbon content, for instance from .95% to 1.1% may be employed but in view of the poor welding properties of high carbon steel I prefer to utilize a rod having not more than .25% carbon. Rods having less than .13% carbon, say as low as .07% carbon, may also be employed but since rods of the .13% to .25% carbon range have satisfactorily welding properties I prefer to have the somewhat higher carbon content present. I do not desire, however, to limit myself to the above ranges as it is within the scope of my invention to utilize any rod in which the carbon and manganese are present below the range necessary to produce a non-magnetic steel.

The coating for the rod includes carbon and manganese in predetermined proportions, a fluxing agent, and a suitable binder.

The carbon may be employed in any suitable form but I prefer to utilize comminuted coke because it enables the formation of a carbide with less carbon, whereas if carbon in a finer form, such as carbon black or lamp black, is utilized, it burns more rapidly during the process and passes off as a gas. In the finished rod the carbon is preferably present in amounts ranging from 1.4% to 1.9%. The greater the carbon content of the base rod the less carbon will be employed in the coating, the limits given referring to the total of the carbon in the base rod and the carbon in the coating.

Manganese may be employed in the coating as ferro-manganese, metallic manganese, or other suitable manganese alloys, or manganese in certain non-metallic forms may be utilized such as manganese dioxide. I prefer to utilize ferro-manganese because it requires less volume than manganese dioxide and because it is less expensive than carbon free manganese. The total manganese content of the base rod and the coating ranges preferably from approximately 12% to 17% by weight. When manganese is employed as an alloy or as a non-metallic compound the amount of the alloy or compound utilized is based, of course, upon the manganaese content thereof.

While any suitable fluxing agent may be employed, such as borax or borates, I prefer to utilize silicon either in the form of ferro-silicon, calcium silicide, sodium silicate, or as silica. The silicon, either in the form of an alloy or as a non-metallic compound, is added in sufficient quantities to produce a light, low melting slag. The total silicon content of the base rod, together with that of the coating, preferably ranges from .08% to .2%. This amount of silicon has been found very satisfactory for metal arc welding in that the proper amount of fluidity is imparted to the molten metal and yet the metal is not so fluid as to inhibit proper penetrative qualities of the rod.

The coating materials may be caused to adhere to the rod in any suitable manner. For example, a paste or suspension may be made of the coating materials and a binder, and the rod dipped in the paste or suspension. As a binding agent I preferably utilize a cellulose base lacquer, such as cellulose acetate or cellulose nitrate, dissolved in a suitable solvent, such as acetone or amyl acetate, although other suitable binders such as shellac, a suitable varnish, or sodium silicate, may be utilized, although if sodium silicate is employed the amount of silicon which is introduced must be taken into consideration in computing the fluxing material.

To illustrate by specific example the advantageous features of my improved electrode, a coating of the following composition was prepared:

74 parts by weight of ferro-manganese (80% manganese) of 200 mesh containing 6% to 8% carbon.
.35 parts by weight of ferro-silicon (47% to 52% silicon).
2 parts by weight of coke flour (200 mesh).
21.3 parts by weight of a cellulose base lacquer.
2.37 parts by weight of solvent for lacquer.

From 12 to 16 grams of the above mixture was uniformly deposited on the exterior surface of an 18 inch steel rod, $\frac{1}{8}$ of an inch in diameter, containing approximately .15% carbon, .5% manganese, 3.5% nickel, and .06% silicon. The rod was then permitted to dry. After drying, the electrode was connected to the positive electrode in an electric circuit and welds were deposited by utilizing a direct current of approximately 120 to 140 amperes. During the welding process the electrode was moved back and forth in the form of a crescent to provide better puddling and a thorough alloying of the coating ingredients.

The deposited metal contained 12.6% manganese, .8% carbon, and 3.23% nickel. The weld was non-magnetic, had a scleroscope hardness of approximately 28, was relatively non-pourous, and was comparatively free from shrinkage cracks.

In practice, I have found that the heavy coating which is necessary to provide sufficient alloying elements permits the use of a lower current than can be successfully utilized with a bare or a lightly coated high manganese steel rod, as the heavy coating stabilizes the arc and confines the heat of the arc to the point where the metal is deposited. It has also been found that elements such as silicon, and compounds containing silicon, incorporated in the coating, enable the deposition of a smoother and less porous deposit than is generally possible with a bare or lightly coated high manganese steel rod.

One of the most important advantages, however, in utilizing my improved rod, is that it permits almost complete control of the respective amounts of carbon and manganese which are deposited in the weld. In prior practice, high manganese-steel rods were produced from ingots in which the manganese and carbon were added as ferro-manganese alloys containing about 6% to 8% carbon. It was the aim of the manufacturer to produce a casting containing 11% to 13% manganese, and 1% to 1.15% carbon, which represents a ratio of about 11 to 1. However, it was difficult to maintain this ratio because the manganese oxidizes more rapidly than carbon and there is accordingly a distinct tendency for the carbon to be high when the manganese is correct. As the amount of carbon in the weld is increased, however, there is more of a tendency to form cracks. For example, a high manganese steel having a carbon content of 1.20% has much more of a tendency to form cracks than a similar alloy containing 1% carbon. It would, of course, be possible to utilize carbon-free manganese and coke flour in the manufacture of manganese steel rods, but the high cost of carbon-free manganese practically precludes such practice.

While it is possible to obtain satisfactory welds without the use of nickel, it is necessary in such cases to frequently quench the base metal during the deposition of the weld. When nickel is added to the base rod, however, the deposited weld is much more ductile and is comparatively free from shrinkage cracks, even though the quenching action is omitted. I therefore find it very desirable to employ a base rod in which at least a small proportion of nickel is present.

From the foregoing specification it will be seen that I have provided a high manganese electrode by means of which welded depositions may be obtained at comparatively low welding currents. As is well known, high manganese steel rods do not have stable arc characteristics at low currents, and the lower the current the more unstable becomes the arc. By applying the major proportion of the manganese as a coating to the rod instead of alloying it with the rod, the arc characteristic more closely approaches the desirable characteristics of low carbon steel.

My improved electrode is not only valuable for joining together steel pieces containing high manganese, but is also particularly adapted for building up worn metal, such as worn car wheel flanges and other worn metal members where high ductility, great strength and resistance to shocks, are necessary.

To those skilled in the art many modifications of and widely different embodiments and applications of my invention will suggest themselves without departing from the spirit and scope thereof. My disclosures and descriptions herein are purely illustrative and are not intended to be in any sense limiting.

What I claim is:

1. A welding electrode comprising a steel base rod containing small amounts of carbon manganese, and coating material associated therewith comprising carbon, manganese, and a fluxing ingredient, the completed electrode having a carbon content of 1.4% to 1.9% and a manganese content of 12% to 17%, the major proportion of the carbon and manganese content being provided by the coating material.

2. A welding electrode comprising a steel base rod containing .13% to .25% carbon and .4% to .8% manganese, and coating material associated with said rod comprising carbon and manganese, the completed electrode having a total carbon content of 1.4% to 1.9% and a manganese content of 12% to 17%.

3. A welding electrode comprising a low carbon steel base rod containing a small amount of manganese, and coating materials associated therewith comprising carbon, manganese, and a fluxing ingredient containing silicon, the completed electrode having a carbon content of 1.4% to 1.9% and a manganese content of 12% to 17%, the major proportion of the carbon and manganese content being provided by the coating material, the silicon being present in sufficient quantities to produce a light low melting point slag.

4. A welding electrode comprising a steel base rod containing .13% to .25% carbon, and .4% to .8% manganese, and coating material associated with said rod comprising carbon, manganese and a fluxing ingredient containing silicon, the completed electrode having a total carbon content of 1.4% to 1.9% and a manganese content of 12% to 17%.

5. A welding electrode comprising a steel base rod containing .13% to .25% carbon, .4% to .8% manganese and .5% to 7% nickel, and a coating material associated therewith comprising carbon and manganese, the completed electrode having a carbon content of 1.4% to 1.9% and a manganese content of 12% to 17%, the major proportion of the carbon and manganese content being provided by the coating material.

6. A welding electrode for building up surfaces on, or for joining metals containing substantial quantities of manganese comprising, in combination, a steel rod containing from five-tenths per cent (.5%) to seven per cent (7%) nickel and relatively small amounts of carbon and manganese, and a coating disposed substantially uniformly on said rod, said coating comprising carbon and manganese in sufficient amounts to provide together with the carbon and manganese contents of the rod a deposit at the weld of substantially the same carbon and manganese content as the metal being welded.

7. A welding electrode for building up surfaces on, or for joining metals containing substantial quantities of manganese comprising, in combination, a steel rod containing from thirteen-hundredths per cent (.13%) to twenty five-hundredths per cent (.25%) carbon and four-tenths per cent (.4%) to eight-tenths per cent (.8%) manganese, and a coating disposed substantially uniformly on said rod, said coating comprising carbon and manganese in sufficient amounts to provide together with the carbon and manganese contents of the rod a deposit at the weld of substantially the same carbon and manganese content as the metal being welded.

8. A welding electrode for building up surfaces on, or for joining metals containing substantial quantities of manganese comprising, in combination, a steel rod containing from five-tenths per cent (.5%) to seven per cent (7%) nickel and from thirteen-hundredths per cent (.13%) to twenty five-hundredths per cent (.25%) carbon and four-tenths per cent (.4%) to eight-tenths per cent (.8%) manganese, and a coating disposed substantially uniformly on said rod, said coating comprising carbon and manganese in sufficient amounts to provide together with the carbon and manganese contents of the rod a deposit at the weld of substantially the same carbon and manganese content as the metal being welded.

JOHN B. AUSTIN.